United States Patent
Mody et al.

(10) Patent No.: US 10,795,807 B2
(45) Date of Patent: *Oct. 6, 2020

(54) PARALLEL TESTING AND REPORTING SYSTEM

(71) Applicant: Accenture Global Solutions Limited, Dublin (IE)

(72) Inventors: Ajay Mody, Austin, TX (US); Vikram Jugal Godani, El Segundo, CA (US); Brad A. Gonnerman, Phoenix, AZ (US); Matthew Ngai, Redwood City, CA (US); Vignesh Kasturi Ravichandran, Redwood City, CA (US); Frederick S. Siy, Redwood City, CA (US)

(73) Assignee: Accenture Global Solutions Limited, Dublin (IE)

(*) Notice: Subject to any disclaimer, the term of this patent is extended or adjusted under 35 U.S.C. 154(b) by 0 days.

This patent is subject to a terminal disclaimer.

(21) Appl. No.: 16/273,456

(22) Filed: Feb. 12, 2019

(65) Prior Publication Data

US 2019/0171555 A1 Jun. 6, 2019

Related U.S. Application Data

(63) Continuation of application No. 15/813,507, filed on Nov. 15, 2017, now Pat. No. 10,241,903.

(51) Int. Cl.
*G06F 9/54* (2006.01)
*G06F 9/44* (2018.01)
(Continued)

(52) U.S. Cl.
CPC ............ *G06F 11/3688* (2013.01); *G06F 8/38* (2013.01); *G06F 11/3664* (2013.01);
(Continued)

(58) Field of Classification Search
CPC . G06F 8/72; G06F 8/74; G06F 11/368; G06F 11/3684; G06F 11/3688;
(Continued)

(56) References Cited

U.S. PATENT DOCUMENTS 5,600,789 A 2/1997 Parker et al.
6,535,011 B1 * 3/2003 Sakaguchi ......... G01R 31/3181
324/210

(Continued)

FOREIGN PATENT DOCUMENTS

EP 2597573 5/2013

OTHER PUBLICATIONS

Mathieu Archer et al., VaryLatex: Learning Paper Variants That Meet Constraints, 2018, [Retrieved on Jul. 22, 2020]. Retrieved from the internet: <URL: https://dl.acm.org/doi/pdf/10.1145/3168365.3168372> 6 Pages (1-6) (Year: 2018).*

(Continued)

*Primary Examiner* — Anibal Rivera
(74) *Attorney, Agent, or Firm* — Brinks Gilson & Lione

(57) ABSTRACT

An optimized test data selection strategy references a sampling file that identifies data attributes that serve as the basis of the test data selection strategy. By analyzing fields and the corresponding field values of the sample imprint, a total number of test data selected for inclusion into a sample dataset is reduced. The test data selection strategy provides an efficient methodology for implementing a data comparison testing process.

20 Claims, 19 Drawing Sheets

(51) Int. Cl.
*G06F 11/36* (2006.01)
*G06F 8/38* (2018.01)
*G06F 16/2457* (2019.01)
*G06F 16/2458* (2019.01)
*G06Q 40/08* (2012.01)
*G06F 8/658* (2018.01)
*G06F 16/28* (2019.01)

(52) U.S. Cl.
CPC ...... *G06F 11/3692* (2013.01); *G06F 16/2462* (2019.01); *G06F 16/24575* (2019.01); *G06Q 40/08* (2013.01); *G06F 8/658* (2018.02); *G06F 11/3604* (2013.01); *G06F 11/3684* (2013.01); *G06F 16/284* (2019.01)

(58) Field of Classification Search
CPC ........ G06F 11/008; G06F 11/00; G06F 11/30; G06F 11/3664; G06F 11/3692; G06F 11/3604; G06F 16/24575; G06F 16/2462; G06F 16/284; G06F 8/38; G06F 8/658; G06Q 40/08
See application file for complete search history.

(56) References Cited

U.S. PATENT DOCUMENTS

| | | | |
|---|---|---|---|
| 7,271,891 B1 | 9/2007 | Xiong et al. | |
| 7,421,621 B1 | 9/2008 | Zambrana | |
| 7,464,297 B2* | 12/2008 | Potter, IV | G06F 11/3684 714/26 |
| 8,386,504 B1 | 2/2013 | Wood et al. | |
| 8,447,532 B1 | 5/2013 | Goroshevskiy et al. | |
| 8,542,127 B1 | 9/2013 | Goroshevskiy et al. | |
| 8,543,428 B1 | 9/2013 | Jones, III et al. | |
| 9,141,514 B1 | 9/2015 | Pavlovitch et al. | |
| 9,256,509 B1 | 2/2016 | Rajagopal et al. | |
| 9,984,198 B2 | 5/2018 | Deciu et al. | |
| 9,996,454 B1 | 6/2018 | Greer et al. | |
| 10,135,749 B2* | 11/2018 | Soni | H04L 47/70 |
| 2003/0058277 A1 | 3/2003 | Bowman-Amuah | |
| 2004/0153382 A1 | 8/2004 | Boccuzzi et al. | |
| 2006/0074793 A1* | 4/2006 | Hibbert | G06Q 40/00 705/38 |
| 2006/0184918 A1 | 8/2006 | Rosaria et al. | |
| 2006/0291398 A1* | 12/2006 | Potter, IV | G06F 11/3684 370/241 |
| 2008/0021667 A1 | 1/2008 | Aiwazian et al. | |
| 2008/0255807 A1* | 10/2008 | Gross | G06F 11/30 702/186 |
| 2008/0256398 A1* | 10/2008 | Gross | G06F 11/00 714/47.2 |
| 2008/0275980 A1* | 11/2008 | Hansen | H04L 67/02 709/224 |
| 2008/0276260 A1* | 11/2008 | Garlick | G06F 11/3688 719/328 |
| 2009/0128943 A1* | 5/2009 | Ishibashi | G11B 5/455 360/31 |
| 2009/0234484 A1* | 9/2009 | Vacar | G06F 11/008 700/110 |
| 2009/0292959 A1 | 11/2009 | Melamed | |
| 2010/0106676 A1 | 4/2010 | Doria | |
| 2010/0302248 A1 | 12/2010 | Houghtlin et al. | |
| 2011/0043443 A1 | 2/2011 | Kawano et al. | |
| 2011/0044501 A1 | 2/2011 | Tu et al. | |
| 2011/0118145 A1* | 5/2011 | Akmaev | C12Q 1/6851 506/12 |
| 2011/0218405 A1 | 9/2011 | Avinash et al. | |
| 2012/0208706 A1 | 8/2012 | Downing et al. | |
| 2013/0024721 A1 | 1/2013 | Kabulepa et al. | |
| 2013/0081000 A1* | 3/2013 | Robinson | G06F 11/3692 717/127 |
| 2013/0108146 A1 | 5/2013 | Li | |
| 2013/0262399 A1* | 10/2013 | Eker | G06F 16/213 707/687 |
| 2013/0318399 A1 | 11/2013 | Srebranig et al. | |
| 2014/0013337 A1* | 1/2014 | Neft | G06F 9/541 719/314 |
| 2014/0180961 A1 | 6/2014 | Hankins et al. | |
| 2014/0310691 A1* | 10/2014 | Ou | G06F 11/368 717/124 |
| 2014/0372142 A1 | 12/2014 | Reddy | |
| 2015/0089063 A1* | 3/2015 | Soni | G06F 11/323 709/226 |
| 2015/0149142 A1 | 5/2015 | Li | |
| 2015/0167092 A1 | 6/2015 | Kartalov et al. | |
| 2015/0293837 A1* | 10/2015 | Rajamanickam | G06F 11/3676 717/130 |
| 2016/0063209 A1 | 3/2016 | Malaviya | |
| 2016/0068915 A1 | 3/2016 | Kennedy et al. | |
| 2016/0224332 A1 | 8/2016 | Kitajima et al. | |
| 2016/0231278 A1 | 8/2016 | Goroshevskiy et al. | |
| 2016/0283353 A1 | 9/2016 | Owen | |
| 2017/0046246 A1* | 2/2017 | Kaulgud | G06F 11/3664 |
| 2017/0122909 A1 | 5/2017 | Goroshevskiy et al. | |
| 2017/0199810 A1 | 7/2017 | Hamilton, II et al. | |
| 2017/0249140 A1* | 8/2017 | Sun | G06F 8/658 |
| 2017/0262361 A1* | 9/2017 | Francis | G06F 11/3672 |
| 2017/0316508 A1 | 11/2017 | Seale | |
| 2017/0322873 A1 | 11/2017 | Morris | |
| 2017/0328697 A1 | 11/2017 | Jansson | |
| 2017/0329693 A1 | 11/2017 | Li et al. | |
| 2018/0089295 A1 | 3/2018 | Dunne et al. | |
| 2018/0203844 A1* | 7/2018 | Greer | G06F 40/194 |

OTHER PUBLICATIONS

Non-Final Office Action issued in corresponding U.S. Appl. No. 15/813,492 dated May 22, 2019, 10 pages.
Extended Search Report issued on European patent application No. 18195773.9 dated Mar. 29, 2019, 9 pages.
Notice of Allowance issued in corresponding U.S. Appl. No. 15/813,476 dated Jun. 20, 2019, 7 pages.
Lianping Chen et al., A systematic review of evaluation of variability management approaches in software product lines, 2010, [Retrieved on Nov. 6, 2018]. Retrieved from internet: <URL: https://ac.els-cdn.com/S0950584910002223/1-s2.0-S0950584910002223-main.pdf?> 19 Pages (344-362) (Year: 2010).
Adam Porter et al., Understanding the source of variation in software inspections, 1998, [Retrieved on Nov. 6, 2018]. Retrieved from the internet: <URL: https//dl.acm.org/citation.cfm?id=268421> 39 Pages (41-79) (Year: 1998).

* cited by examiner

Table 600 — Pre-Exclusions / Exclusions:

| Health Claim Type | Grand Total | EDI/Paper | Total | % to Total | Date of Service (%) | Exclusion 1 (%) | Exclusion Total | % |
|---|---|---|---|---|---|---|---|---|
| Institutional | 35,527 | EDI | 32,967 | 21% | 1,674 (5%) | 3,472 (11%) | 5,146 | 16% |
|  |  | Paper | 2,560 | 2% | 765 (30%) | 277 (11%) | 1,042 | 41% |
| Professional | 118,228 | EDI | 107,981 | 70% | 3,061 (3%) | 587 (1%) | 3,648 | 3% |
|  |  | Paper | 10,247 | 7% | 1,822 (18%) | 90 (1%) | 1912 | 19% |
| Total | 153,755 |  | 153,755 | 100% | 7,322 (5%) | 4,426 (3%) | 11,748 | 8% |

Table 610 — Available Pool of Claims:

|  |  | Total Claims Available for Sampling | % to total | Sampling File & Coverage | Denied Claims |
|---|---|---|---|---|---|
| Institutional | EDI | 27,766 | 84% | 25,819 | 1,947 |
|  | Paper | 1,426 | 56% | 989 | 437 |
| Professional | EDI | 103,796 | 96% | 85,924 | 17,872 |
|  | Paper | 7,682 | 74% | 5,186 | 2,496 |
| Total |  | 140,670 | 91% | 117,917 | 22,752 |

Figure 6

| Claim Type | Total Claims Available for Sampling | EDI/Paper | Sampling File/ Coverage Selected Claims (%) | Selected Denied Claims (%) | Grand Total (%) |
|---|---|---|---|---|---|
| Institutional | 35,527 | EDI | 2,622 (7.38%) | 54 (0.15%) | 2,676 (7.53%) |
| | | Paper | 14 (0.04%) | 0 (0.00%) | 14 (0.04%) |
| Professional | 118,228 | EDI | 2,959 (2.5%) | 62 (0.05%) | 3,021 (2.55%) |
| | | Paper | 35 (0.03%) | 0 (0.00%) | 35 (0.03%) |
| Total | 153,755 | | 5,630 (3.66%) | 116 (0.08%) | 5,746 (3.74%) |

| Total Count ≥ Than | Number of Combinations | Number of Claims | Number of Claims Selected per Combination | Count Selected |
|---|---|---|---|---|
| 500 | 3 | 2,919 | 5 | 15 |
| 300 | 4 | 1,371 | 4 | 16 |
| 150 | 7 | 1,218 | 3 | 21 |
| 75 | 21 | 2,134 | 2 | 42 |
| 2 | 2,240 | 14,734 | 1 | 2,240 |
| <2 | 3,443 | 3,443 | - | - |
| Total Claims Selected | 5,718 | 25,819 | | 2,334 |
| Included | 2,275 | | 22,376 | |
| Excluded | 3,443 | | 3,443 | |

Test Bed#:8268  #Processed: 8822  #Clear: 5047  #Variance: 3557

| Select All | Run ID | ID | Sys | Status | State | Match | Match ID | Review Status | Type | Sub Type | MRN | DOS From | DOS To | Bill Amount | Bill Amount Variance | Cost Shared | Cost Shared Variance | All Amount | All Amount Variance | Finance |
|---|---|---|---|---|---|---|---|---|---|---|---|---|---|---|---|---|---|---|---|---|
| ☐ | | ⊘ 5016020364905000 | L | Processed | | | 5016020364905000 | Under Review | EXT | -- | 6346197223 | 1/13/2016 | 1/15/2016 | $16532.50 | | $450.00 | | $6727.00 | | |
| ☐ | | ⊘ 5016035567091000 | L | Processed | | | 5016035567091000 | Under Review | EXT | -- | 6219907767 | 1/28/2016 | 1/28/2016 | $20040.40 | $0.00 | $0.00 | $0.00 | $11423.04 | $11423.04 | |
| [P] | A-12512011 | 1168409 | T | Pending | Normal Claim | No | 5016035567091000 | To Be Reviewed | EXT | -- | 7081114700 | 1/28/2016 | 1/28/2016 | $20040.40 | | $0.00 | | $0.00 | | |
| ☐ 901 | | ⊘ 5016040567649990A | L | Processed | | | 5016040567649990A | Under Review | EXT | -- | 6644195403 | 1/30/2016 | 1/31/2016 | $23942.72 | $0.00 | $2400.30 | $2400.30 | $8001.00 | $8001.00 | |
| [P] | A-12504248 | 1159765.1 | T | Pending | Readjudicate 1 | No | 5016040567649990A | To Be Reviewed | EXT | -- | 0709132422 | 1/30/2016 | 1/31/2016 | $23942.72 | | $0.00 | | $0.00 | | |
| ☐ | | ⊘ 5016041567986550A | L | Processed | | | 5016041567986550A | Under Review | EXT | -- | 5433153152 | 1/21/2016 | 2/1/2016 | $65335.44 | $0.00 | $0.00 | $0.00 | $17600.00 | $17600.00 | |
| [P] | A-12511292 | 1167825 | T | Pending | Normal Claim | No | 5016041567986550A | To Be Reviewed | EXT | -- | 3037129238 | 1/21/2016 | 2/1/2016 | $65335.44 | | $0.00 | | $0.00 | | |
| ☐ | | ⊘ 5016082573595700 | L | Processed | | | 5016082573595700 | Under Review | EXT | -- | 0065178327 | 3/12/2016 | 3/14/2016 | $30859.14 | $0.00 | $5382.75 | $5382.75 | $30859.14 | $30859.14 | |
| [P] | A-12504278 | 1159876.1 | T | Pending | Readjudicate 1 | No | 5016082573595700 | To Be Reviewed | EXT | -- | 1030208891 | 3/12/2016 | 3/14/2016 | $30859.14 | | $0.00 | | $0.00 | $30859.14 | |

910: Clear Filters | Custom Filters | Variance Filters | Pend Analysis | Assigned Filter | Reviewed Filter

Manual Process Step: Claims Pending Analysis Example

1000

Pend Analysis: [Defect ▽]
Completed By: [User A ▽]
  Select Action
  Clear Pend
  Defect

Pend Analysis                    Close

Legacy ID: 5016041567985550A    New System Claim ID: 1167825

Pend Analysis: [Clear Pend ▽]
Completed By: [User A ▽]
Completion Date: [05/04/2017]

Comments: [The pend was successfully cleared]

Minimum 12 Characters Required.

[Update]

FIG. 10

Pend Analysis

Manual Process Step: Claims Pending Analysis Example

Legacy ID: 50160415679855OA  New System Claim ID: 1167825

Pend Analysis: [Defect ▽]

Completed By: [User A ▽]          Completion Date: [05/04/2017]

⊙ Was a Defect Encountered While Clearing the Pend?

Variance Source: [Select Variance Source ▽]

- Select Variance Source
- Target Accumulator Defect
- Target App Build (Code Defect)
- Training
- Coverage Mismatch
- Target Benefit Configuration Error
- Target Provider Configuration Error Define Defect  [ × ]

Add Variance Source

[Update]

Close

Variance Analysis: Potential Defect Tracking

1200 →

[Home] [WorkBasket] [Claims ▽] [Issues ▽] [Dashboard ▽] [Log Out]

[Confirmed Defects] [Temp Defects]    [Filter] [Clear]    [Display All]

| Select All | Claim ID | Temp Defect ID | Variance Source | | Defect Details | | Type | Created By | Created Date | Coverage | Service Area |
|---|---|---|---|---|---|---|---|---|---|---|---|
| ☐ ✎ | 1167338 | TMP-307 477403 | Target Accumulator Defect | | Root Cause:asdad<br>Original Legacy ID:50160205649050000,<br>New Claim ID:1167338,<br>Expected Result:asdasd,<br>Actual Result:asdasd,<br>Vendor Name:vendor_123<br>Group Name:ABC Hospital<br>Provider Name:provider_123<br>Plan Name:2756363<br>LOB:Medicare<br>MRN:312645738<br>Created By: User B | 𝒪 | Pend Review | User B | 05/03/2017 | | |

Displaying 1 to 1 from 1 Claims  [10 ▽]
[«] [<] [ 1 ] [>] [»]

[Choose File] No File chosen    [Upload]    [Export]    [Unlock]

FIG. 12

Update Defects 1300

Claim ID: 1167338    Temp Defect Id: TMP-3074477403    Close

Approval Status: [Please select a value ▽]
Please select a value
Approved
Denied
Returned Comments: [          ]

[Submit]

Update Defects

Claim ID: 1167338    Temp Defect Id: TMP-3074477403    Close

Approval Status: [Approved ▽]

Confirmed Defects: [Please select a value ▽]
Please select a value
11623
11779
11786
12062

☐ Enter Defect Id

Comments: [The temp defect TMP-3074477403 is related to the 11623]

[Submit]

FIG. 13

Update Defects

1400

Update Defects — Claim ID: 1167338 — Temp Defect Id: TMP-3074777403 — Close

Approval Status: Returned ▽

Comments: Please add screenshot

[Submit]

Update Defects — Claim ID: 1167338 — Temp Defect Id: TMP-3074777403 — Close

Approval Status: Denied ▽

Assigned To: Select user ▽

Select user
User C
User D
User E

Comments: Please re-review the claim

[Submit]

FIG. 14

Variance Review

Variance Analysis: Claims Review

Test Bed#:8268   #Processed: 8622   #Clean: 5047   #Variance: 3557

[Clear Filters] [Home] [WorkBasket] [Claims ▾] [Issues ▾] [Dashboard ▾] [Log out]
[Custom Filters] [Variance Filters] [Pend Analysis] [Assigned Filter] [Reviewed Filter]

| Select All ☐ ⊘ | Run ID | ID | Sys | Status | State | Match | Match ID | Review Status | Type | Sub Type | MRN | DOS From | DOS To | Bill Amount | Bill Amount Variance | Cost Shared | Cost Shared Variance | All Amount | All Amount Variance |
|---|---|---|---|---|---|---|---|---|---|---|---|---|---|---|---|---|---|---|---|
| ☐ | | 5016075572688300 | | Processed | | | 5016075572688300 | Under Review | EXT | -- | 5149194644 | 3/4/2016 | 3/4/2016 | $3378.16 | | $0.00 | | $407.17 | |
| ✎ | A-12246987 | 222222 | T | Ready For Review | Readjudicate 3 | No | 5016075572688300 | To Be Reviewed | EXT | -- | 7574114864 | 3/4/2016 | 3/4/2016 | $3378.16 | $0.00 | $850.00 | $-850.00 | $1801.00 | $-1393.83 |
| 1501 | A-12187753 | 11591160.3 | T | Ready For Review | Readjudicate 3 | No | 5016075572688300 | To Be Reviewed | EXT | -- | 0077190471 | 3/4/2016 | 3/4/2016 | $3378.16 | $0.00 | $850.00 | $-850.00 | $1801.00 | $-1393.83 |
| | A-12069300 | 11591160.2 | T | Ready For Review | Readjudicate 2 | No | 5016075572688300 | To Be Reviewed | EXT | -- | 9407147801 | 3/4/2016 | 3/4/2016 | $3378.16 | $0.00 | $850.00 | $-850.00 | $1800.00 | $-1392.83 |
| | A-12029815 | 11591160.1 | T | Ready For Review | Readjudicate 1 | No | 5016075572688300 | To Be Reviewed | EXT | -- | 8982163976 | 3/4/2016 | 3/4/2016 | $3378.16 | $0.00 | $800.00 | $-800.00 | $500.00 | $-92.83 |
| | A-11970568 | 11591160 | T | Ready For Review | Readjudicate 1 | No | 5016075572688300 | To Be Reviewed | EXT | -- | 5391154754 | 3/4/2016 | 3/4/2016 | $3378.16 | $0.00 | $700.00 | $-700.00 | $500.00 | $-92.83 |
| ☐ | | 5016075572692600 | L | Processed | | | 5016075572692600 | Under Review | EXT | -- | 5959211862 | 3/2/2016 | 3/5/2016 | $32659.50 | | $795.00 | | $6183.26 | |
| ☐ | | 5016075572724200 | L | Processed | | | 5016075572724200 | Under Review | EXT | -- | 09866312 | 3/7/2016 | 3/7/2016 | $1825.40 | | $0.00 | | $1126.00 | |
| ✎ | A-12510195 | 1166892 | T | Ready For Review | Normal Claim | No | 5016075572724200 | To Be Reviewed | EXT | -- | 3512180032 | 3/7/2016 | 3/7/2016 | $1825.40 | $0.00 | $351.19 | $-351.19 | $1126.00 | $0.00 |

Update Analysis

Legacy ID: 50160755572689300  Target Claim ID: 222222

⊙ The Variance is Not Acceptable?

Variance Source: [Select Variance Source ▽]  [Define Defect] ×

Add Variance Source

⊙ The Variance is Acceptable?

Allowed Amount Variance Source: [Select Variance Source ▽]  Reason Code: [Select Reason Code ▽]

Add Variance Source

Cost Share Variance Source: [Select Variance Source ▽]  Reason Code: [Select Reason Code ▽]

Add Variance Source

Allowed Amount
Variance Comments:
Minimum 12 Characters Required.

Cost Share
Variance Comments:

[Update]  [Close]

The Variance is Acceptable?

Allowed Amount Variance Source: [Legacy Adjudication Incorrect ▽]  Reason Code: [Adjusted Claim in Legacy ▽]

Add Variance Source

Cost Share Variance Source: [Test Environment Variance ▽]  Reason Code: [Data Mismatch between Comp ▽]

Add Variance Source

Explanation :

Adjusted Claim in Legacy: This applies when the original claim in Legacy has been updated or adjusted after it was extracted. Confirm that the calculations in Target system are correct. Target claim may with align with updated Legacy Processing in production.

Data Mismatch between Comparison tool and Legacy: There is a mismatch between current state Legacy data and the comparison tool data for legacy claim processing. This reason code is only to be used where the Legacy data now matches Target (primarily due to an adjustment or readjudication in legacy).

Allowed Amount Variance Comments: [Allowed amount variance is due to the claim has been adjusted in Legacy]

Minimum 12 Characters Required.

Cost Share Variance Comments: [Cost Share variance is due to the data mismatch between the Comparison tool and legacy because of the adjustment]

[Update]

PARALLEL TESTING AND REPORTING SYSTEM

CROSS REFERENCE TO RELATED APPLICATIONS

This application is a continuation application of U.S. application Ser. No. 15/813,507, filed Nov. 15, 2017, which is herein incorporated by reference in its entirety.

TECHNICAL FIELD

This application relates to the optimized construction and analysis of a sampling data format, where the sampling data format is referenced to generate multiple datasets for use in comparison testing. The comparison testing may be implemented to detect variances between legacy systems and new target systems, and/or between legacy processes and new processes, which may be part of parallel testing. This application also relates to a testing and reporting tool that utilizes the sampling data format for comparison testing.

BACKGROUND

The proliferation of high-speed communication networks has resulted in vast amounts of digital data becoming available for analysis by remote resources that may be located at distant physical locations, yet enabled to receive and provide effective services due to their connection to the high-speed communication networks. In step with the increased availability of information through the high-speed communication networks are the improvements being made to applications that rely on such information.

As the capabilities of these applications are updated and improved, new versions of the applications are tested to ensure they perform as expected. To confirm the performance of the new application versions, parallel testing is performed to compare performance of the new applications against the performance of prior, legacy versions. Parallel testing involves inputting a common sample dataset into both the legacy and new versions of the application and comparing the results produced by both versions. The parallel testing may also be applied to test new processes that are included in the new application version. Any detected differences in the results are then further examined to determine whether variances exist in the new application versions, or whatever other processes are being compared.

BRIEF DESCRIPTION OF THE DRAWINGS

FIG. 6 shows an exemplary table representing a test data selection strategy.

FIG. 7 shows an exemplary table including test data selection statistics.

FIG. 8 shows another exemplary table representing a test data selection sampling methodology.

FIG. 9 shows an exemplary graphical user interface of the parallel testing and reporting tool.

FIG. 10 shows another exemplary graphical user interface of the parallel testing and reporting tool.

FIG. 11 shows another exemplary graphical user interface of the parallel testing and reporting tool.

FIG. 12 shows another exemplary graphical user interface of the parallel testing and reporting tool.

FIG. 13 shows another exemplary graphical user interface of the parallel testing and reporting tool.

FIG. 14 shows another exemplary graphical user interface of the parallel testing and reporting tool.

FIG. 15 shows another exemplary graphical user interface of the parallel testing and reporting tool.

FIG. 16 shows another exemplary graphical user interface of the parallel testing and reporting tool.

FIG. 17 shows another exemplary graphical user interface of the parallel testing and reporting tool.

FIG. 18 shows another exemplary graphical user interface of the parallel testing and reporting tool.

DETAILED DESCRIPTION

Figure 1:
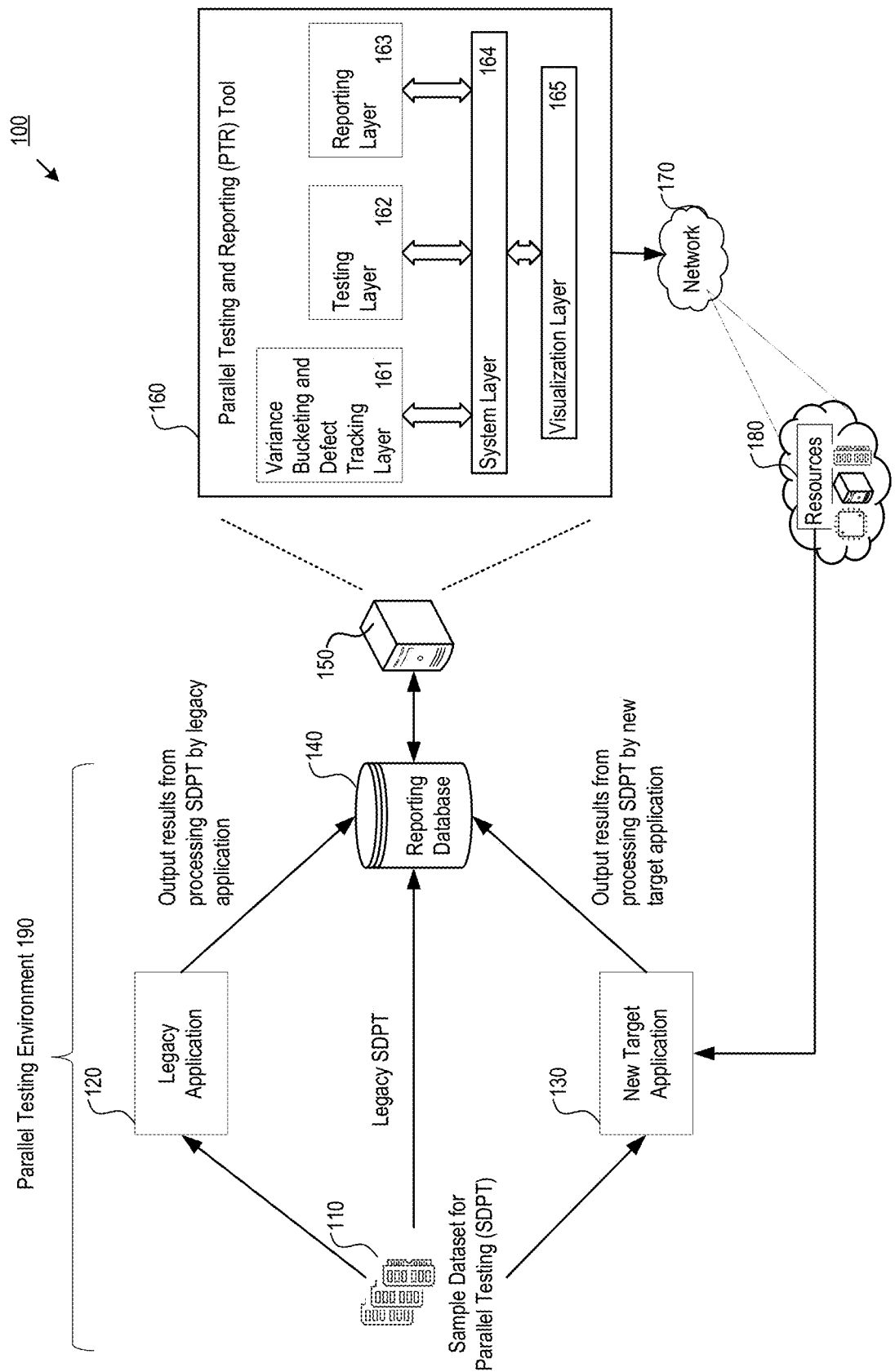
FIG. 1 shows an architecture for a parallel testing and reporting system.

One of the benefits brought on by high-speed communication networks and the availability of cheaper and larger data storage capacities is the access to more information that can be included in a sample dataset to be used, for example, in a comparison testing process. The comparison testing process may look to feed the sample dataset into a changing set of systems, applications, and/or processes, and compare a first set of output data against a second set of output data to identify variances against the systems, applications, and/or processes that produced the first set of output data and the second set of output data. While comparison testing based on the entire set of available data provides the most comprehensive results, this may not be the most efficient solution from a timing and resource efficiency standpoint.

Therefore, a technical solution is provided where the comparison testing process includes generating a new sample imprint comprised of one or more combinational strings, and referencing the sample imprint to select a sample dataset from the entire set of available data for feeding into two separate systems, applications, and/or processes to produce the resulting outputs for comparison. An effective sample dataset includes data that accurately represents the entire population of available data. For example, a measure of an effective sample dataset is to include an appropriate ratio of the different types of data that comprise the entire population of available data so that the sample dataset does not misrepresent the composition of the entire population of available data. Therefore, the sample imprint includes combinatorial strings that include strings of data that represent specific attributes that will be referenced to select the data for inclusion into a sample dataset. The sample imprint is a data model that improves the computer capabilities of a computing device reading the sample imprint by improving a speed and efficiency with which the computing device is able to select test data from a large dataset of available data, where the selected test data is included into a sample dataset for further testing (e.g., parallel testing, or more generally comparison testing).

In addition, some embodiments relate to a specific application of the sample datasets as inputs to a parallel testing process. An effective parallel testing process looks to test a wide range of sample datasets through a new application version to ensure the new application version operates as intended under envisioned scenarios. However, even with the improved technological capabilities, there may be a threshold where increasing the number of test data in the sample dataset produces diminishing returns. That is, parallel testing may be better served by optimizing the sample dataset to include a determined optimal number, or range, of test data having certain characteristics, rather than simply increasing the number of test data without methodology. For example, optimization may include removing instances of duplicate data and ensuring that the sample dataset contains enough different data types to provide an accurate representation of a test data landscape without adversely affecting processing efficiency due to including too much test data for processing. To generate such an optimized sample dataset, a test data selection strategy based on the dedicated sample imprint is disclosed.

Figure 19:
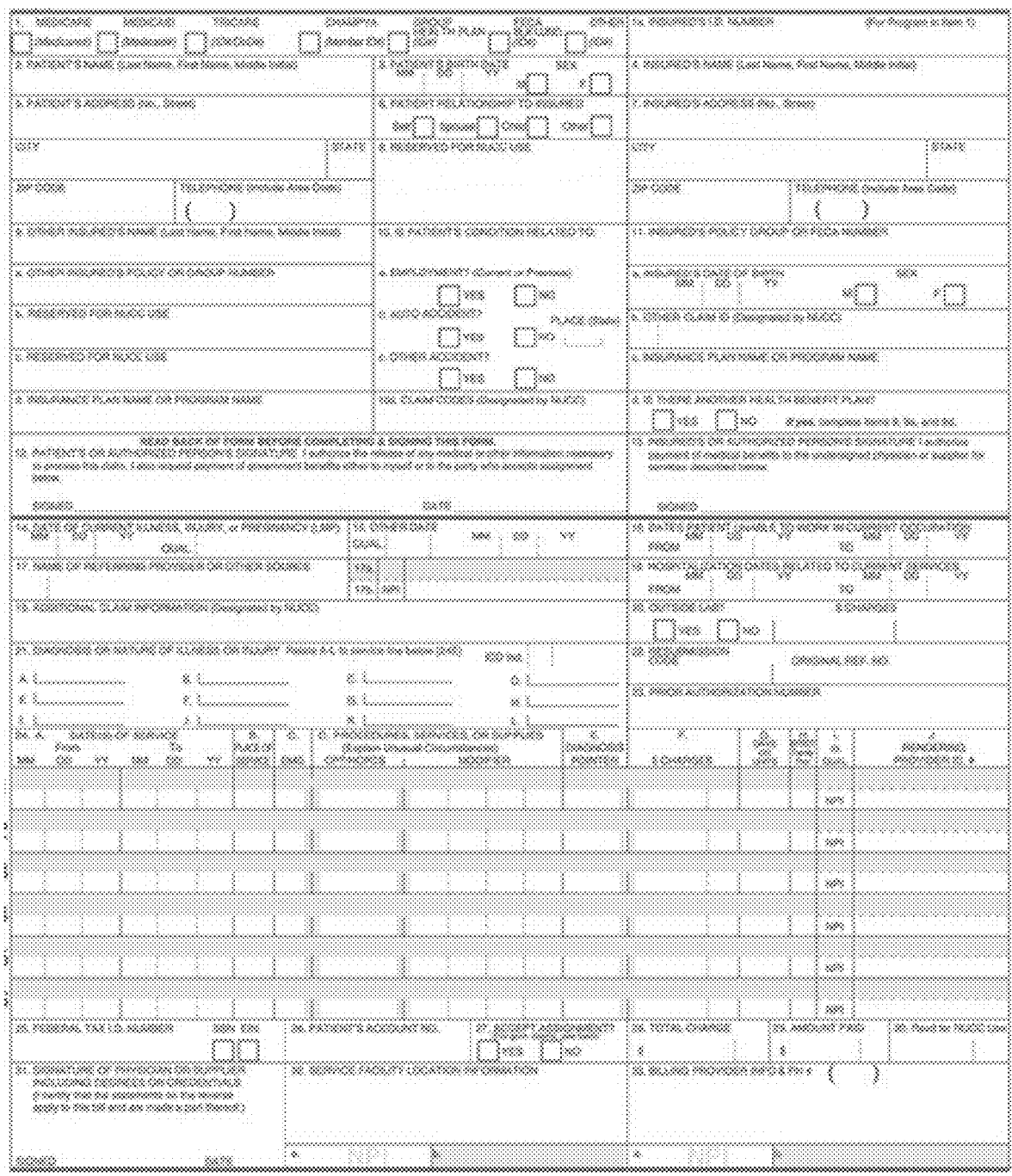
FIG. 19 shows an exemplary insurance claim form.

The test data considered for inclusion into a sample dataset is any data having distinct characteristics, attributes, and/or data fields that are measurable to produce comparison results that identify variances between the test data after a comparison testing process involving the sample datasets. In particular, according to the embodiments where the sample datasets will serve as inputs to the parallel testing applications or processes, the test data may include information found on medical insurance claims. More specifically, the test data may include information found on an electronic data interface (EDI) file that is representative of, and includes information found on, a medical insurance claim (e.g., information provided on a Centers for Medicare & Medicaid Services form 1500 ("CMS-1500")). An exemplary CMS-1500 form 2700 is shown in FIG. 19, where the CMS-1500 form includes exemplary insurance claim attributes describing information related to a particular medical procedure (e.g., provider of insurance, place of medical services, line of business, patient information, or the like). The test data may also be any other type of electronic document that includes distinct information fields, which may, or may not, later be processed by an application being updated and parallel tested (e.g., auto insurance claim).

Also disclosed is a parallel testing and reporting tool for managing a parallel testing process. The parallel testing and reporting tool includes features for controlling a parallel testing process by selecting test data (e.g., the insurance claims) for inclusion into the sample dataset, processing the test data included in the sample dataset through a legacy application and a new target application, storing the output results from the legacy application and the new target application using a reporting database, comparing the output results to detect differences (e.g., differences in determined insurance coverage after processing the same insurance claim), determining whether any of the differences are directed to defect issues in the new target application or acceptable/planned differences, and reporting identified defect issues directed to one or more resources associated with fixing defect issues. Processing the test data included in the sample dataset through the legacy application and the new target application may include computer-based processes, as well as any manual processes that are interjected for supporting the computer-based processes.

The parallel testing and reporting tool provides a technical solution to technical problems arising during the parallel testing of applications that are being updated from older legacy versions to new target versions. In particular, the parallel testing and reporting tool improves the computing capabilities of the computing device running the parallel testing and reporting tool by improving a speed and efficiency to generate reports identifying defect/variance issues of the new application detected during the parallel testing, and presenting these reports to the appropriate resources. In certain embodiments, the parallel testing and reporting tool is programmed to report the detected issues directly to the resources responsible for addressing the issues automatically. This is a valuable technological feature that provides immediate efficiency benefits when resources are crowd sourced from remote locations. For example, the direct presentation of the report to the appropriate resources allows the resources to immediately analyze the reported issues and provide remedial measures on the new version of the application in a time-efficient manner. A more detailed description of these features offered by the parallel testing and reporting tool is provided herein.

The parallel testing and reporting tool also includes features for controlling a number, and type, of test data (e.g., insurance claims) that are included in a sample dataset by modifying the combinatorial strings that comprise the sample imprint. The parallel testing and reporting tool does so, in part, by controlling selection "levers" of the sample imprint. For example, a selection lever may include modifying a number of fields that are included in the sample imprint referenced during the test data selection strategy (e.g., claim selection strategy), and/or modifying the value of fields in the sample imprint referenced during the test data selection strategy. A more detailed description of the sample imprint and the combinatorial strings that comprise the sample imprint is provided with reference to FIG. 4.

The reliance on sample imprints as part of the test data selection strategy is a technological improvement to previously known test data selection strategies that does not rely on the sampling file format. Previous selection strategies have failed to efficiently select test data for inclusion into sample datasets, because previous selection strategies did not rely on the control of specific selection levers provided by the sample imprint. Thus the sample imprint offers a flexible and efficient way to modify the number and/or type of test data considered for inclusion in the sampling file. For example, the number of test data insurance claims considered for inclusion can be selected in a manner that reduces the number of duplicate or redundant insurance claims being selected as compared to conventional claim selection techniques.

Figure 2:
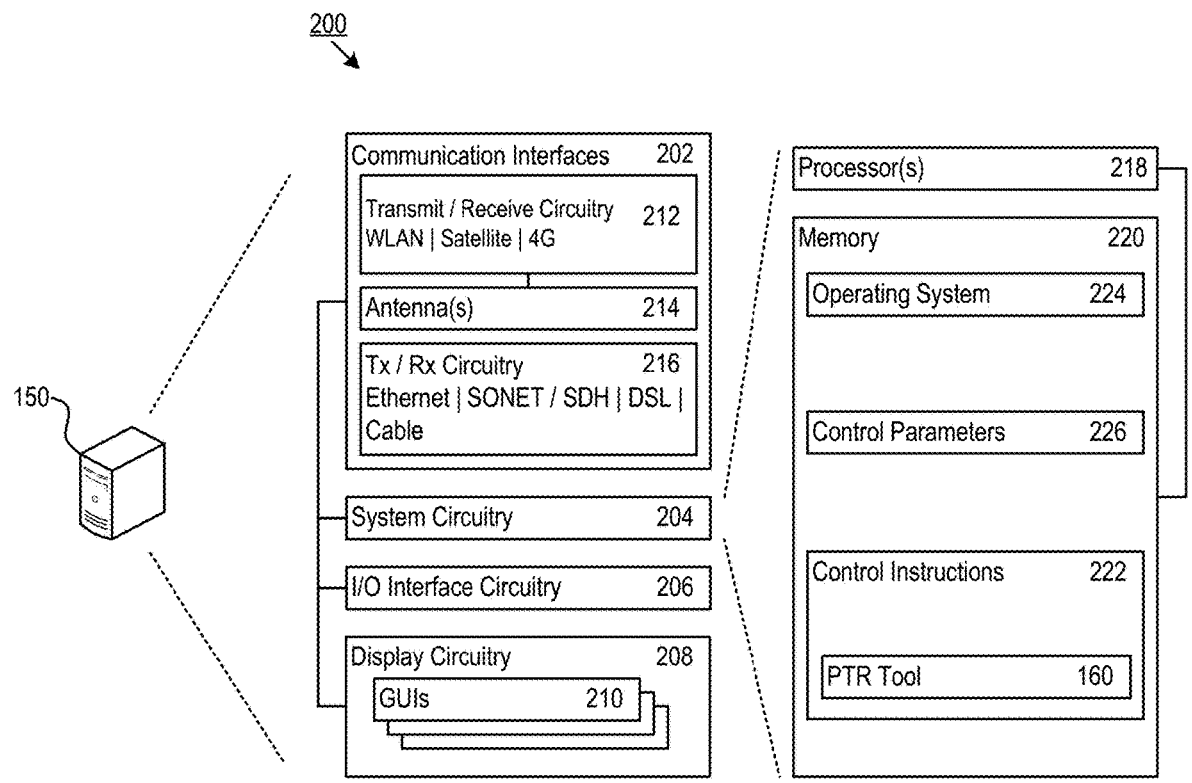
FIG. 2 illustrates an exemplary architecture for a host cloud computer running a parallel testing and reporting tool.

FIGS. 1 and 2 provide an exemplary context for the discussion of technical solutions provided by a parallel testing and reporting (PTR) system 100. The examples in FIGS. 1 and 2 illustrate an example of many possible different implementation contexts that may include fewer, or additional, components. In that respect, the technical solutions are not limited in their application to the architectures and systems shown in FIGS. 1 and 2, but are applicable to other system implementations, architectures, and connectivity. Reference to insurance claims are a specific instance of test data for exemplary purposes, and other types of test data may be substituted, as described herein.

FIG. 1 shows an architecture for a parallel testing and reporting (PTR) system 100 including various components for implementing the features of the PTR system 100 described herein. System 100 can include a parallel testing environment 190 including a legacy application 120, a new target application 130, a reporting database 140, and a sample dataset for parallel testing (SDPT) 110. The parallel testing environment 190 includes the legacy application 120 for processing SDPT 110 and outputting results from processing the SDPT 110. The parallel testing environment 190 also includes the new target application 130 for processing the same SDPT 110 as input to the legacy application 120, and outputting results from processing the same SDPT 110. The outputs from both the legacy application 120 and the new target application 130 that result from processing the same SDPT 110 are transmitted to the reporting database 140 and stored on the reporting database 140. The results that are stored on the reporting database 140 are retrieved for comparison testing, as described in more detail herein.

The SDPT 110 is a collection of one or more insurance claims that have been selected from a larger population of available insurance claims based on a selection strategy that references specific sampling files. The new target application 130 is an updated version of the legacy application 120 for processing insurance claims. For example, legacy application 120 can process claims to determine a scope of insurance coverage for a medical procedure described in the processed claims. The initial population of insurance claims available for consideration into the SDPT 110 may include one or more legacy insurance claims that have previously been processed by the legacy application 120. This way, the legacy claim processing results (i.e., the legacy SDPT) offer a baseline of output results after being processed by the legacy application 120. According to some embodiments, resulting outputs from the new target application 130 may be compared directly with the legacy claim processing results corresponding to the same insurance claim inputs, thus saving a round of redundant processing of insurance claims through the legacy application 120.

The same SDPT 110 is fed into both the legacy application 120 and the new target application 130, and the resulting outputs from the legacy application 120 and the new target application 130 are stored on the reporting database 140. Since outputs from the legacy application 120 and the new target application 130 originate from the same SDPT 110 input, the two outputs may be stored together on the reporting database 140 as a pair. The resulting output from the new target application 130 may also be paired in the reporting database 140 with the legacy insurance claims corresponding to the same insurance claim inputs. The resulting output from the legacy application 120 is a determination of insurance coverage for the insurance claims processed by the legacy application 120, and the resulting output from the legacy application 120 is a determination of insurance coverage for the same insurance claims processed by the new target application 130. Assuming the legacy application 120 is operating properly and producing baseline results, the results output from the new target application 130 should match the baseline results output from the legacy application 120 when the new target application 130 is operating properly. Variances in the output results when the same insurance claims are processed by the legacy application 120 and the new target application 130 may indicate a defect issue with the new target application 130.

Also included in the PTR system 100 is a host computer 150 running a PTR tool 160. The host computer 150 is in communication with the reporting database 140 to retrieve the testing outputs stored on the reporting database 140. The PTR tool 160 includes a variance bucketing and defect tracking layer 161, a testing layer 162, and a reporting layer 163. Each layer includes software, hardware, user interfaces, and/or circuitry for implementing the features of the respective layer. Each of the variance bucketing and defect tracking layer 161, the testing layer 162, and the reporting layer 163, are in communication with a system layer 164 and a visualization layer 165. The system layer 164 includes software, hardware, and/or circuitry for communicating with the host computer 150 to ensure the PTR tool 160 operates properly on the host computer 150. The visualization layer 165 includes software, hardware, and/or circuitry for communicating with the host computer 150 for presenting information provided by the PTR tool 160 using, for example, a display device. The system layer 164 drives the visualization layer 165 that renders or outputs, for instance, a set of graphical user interfaces (GUIs) including visualizations and presentation of information that facilitate the parallel testing and reporting features provided by the PTR tool 160.

The PTR system 100 also includes a resource 180 that is in communication with the host computer 150 through communication network 170. The PTR tool 160 running on the host computer 150 reports detected issues from the parallel testing to the resource 180, and the resource 180 may be configured to address the issues on the new target application 130.

The resource 180 may be representative of one of a plurality of different resources in communication with the host computer 150 that are geographically located at many different resource sites globally. For certain types of resources (e.g., virtualized computing resources) the resource sites may be service providers that host the resource 180. The resource sites and the resource 180 may be located in any geographic region, e.g., United States (US) East, US West, Central Europe, Asia, or other offshore location. The resource 180 may correspond to any element of the parallel testing and reporting execution, whether specific individuals (e.g., an application tester), hardware resources (e.g., CPU, memory and disk resources), or software resources (e.g., algorithm or function packages, application software, operating systems, or database management systems). In addition, the resource 180 and resource sites may provide resource descriptors for the resource 180. The resource descriptors may include data that characterizes, defines, or describes the resource 180. A few examples of resource descriptors include, but are not limited to, data identifying abilities, speed, reliability, location, availability, languages, cost, capability, capacity, experience, skill descriptors, historical performance data, and execution capability data. In addition or alternatively, the resource 180 and resource descriptors may also be present locally within an enterprise that seeks to carry out a parallel testing project.

Throughout the network architecture of the PTR system 100 are one or more networks, e.g., the network 170, that enable communication between device components of the PTR system 100 shown in FIG. 1. The networks provide connectivity between resources, resource descriptors, service providers, enterprises, as well as between the components of the PTR system 100 that may be physically located in remote locations from each other. The networks may include private and public networks defined over any predetermined and possibly dynamic internet protocol (IP) address ranges.

FIG. 2 shows an example implementation of an architecture for the host computer 150 that runs the PTR tool 160, as implemented on a computer device 200. The architecture of the computer device 200 includes communication interfaces 202, system circuitry 204, input/output (I/O) interface circuitry 206, and display circuitry 208. The visualization layer 165 generates the GUIs 210 locally using the display circuitry 208, or for visualization, e.g., as HTML, JavaScript, audio, and video output for a web browser running on a local or remote machine. Among other interface features, the GUIs 210 may render interfaces for presenting identified differences between resulting outputs from the parallel testing, presenting options for identifying known sources behind defect issues detected during the parallel testing, tracking the progress of fixing identified defect issues, reporting defect issues to resources, modifying sampling files, modifying an overall pool of available insurance claims for consideration into the SDPT 110, and other features.

The GUIs 210 and the I/O interface circuitry 206 may include touch sensitive displays, voice or facial recognition inputs, buttons, switches, speakers and other user interface elements. Additional examples of the I/O interface circuitry 206 includes microphones, video and still image cameras, headset and microphone input/output jacks, Universal Serial Bus (USB) connectors, memory card slots, and other types of inputs. The I/O interface circuitry 206 may further include magnetic or optical media interfaces (e.g., a compact disc read-only memory (CDROM) or digital video disc (DVD) drive), serial and parallel bus interfaces, and keyboard and mouse interfaces.

The communication interfaces 202 may include wireless transmitters and receivers ("transceivers") 212 and any antennas 214 used by the transmit and receive circuitry of the transceivers 212. The transceivers 212 and antennas 214 may support wireless fidelity (WiFi) network communications, for instance, under any version of Institute of Electrical and Electronics Engineers (IEEE) 802.11, e.g., 802.11n or 802.11ac. The communication interfaces 202 may also include wireline transceivers 216. The wireline transceivers 216 may provide physical layer interfaces for any of a wide range of communication protocols, such as any type of Ethernet, data over cable service interface specification (DOCSIS), digital subscriber line (DSL), Synchronous Optical Network (SONET), or other protocol.

The system circuitry 204 may include a combination of hardware, software, firmware, or other circuitry. The system circuitry 204 may be implemented, for example, with one or more systems on a chip (SoC), application specific integrated circuits (ASIC), microprocessors, discrete analog and digital circuits, and other circuitry. The system circuitry 204 may implement any desired functionality in the PTR tool 160, including the variance bucketing and defect tracking layer 161, the testing layer 162, the reporting layer 163, the system layer 164, and the visualization layer 165. As just one example, the system circuitry 204 may include one or more instruction processors 218 and memories 220. The memories 220 store, for example, control instructions 222 and an operating system 224. In one implementation, the processor 218 executes the control instructions 222 and the operating system 224 to carry out desired functionality for the PTR tool 160 that is represented as running on the computer device 200 shown in FIG. 2. This includes functionality described below for the variance bucketing and defect tracking layer 161, the testing layer 162, the reporting layer 163, the system layer 164, and the visualization layer 165. The control parameters 226 provide and specify configuration and operating options for the control instructions 222, operating system 224, and other functionality of the computer device 200.

The execution of the control instructions 222 by the processor 218 drives the functionality of the PTR tool 160 running on the computer device 200. The variance bucketing and defect tracking layer 161, the testing layer 162, the reporting layer 163, the system layer 164, the visualization layer 165, as well as the structure and content of the generated GUIs by the PTR tool 160 improve the functioning of the underlying computer hardware of the computer device 200 itself. That is, these features (among others described below) are specific improvements in the way that the underlying computer device system operates as compared to operation of the computer device system when implementations of the invention are absent. The improvements facilitate more efficient, accurate, consistent, and precise execution of the parallel testing.

Figure 3:
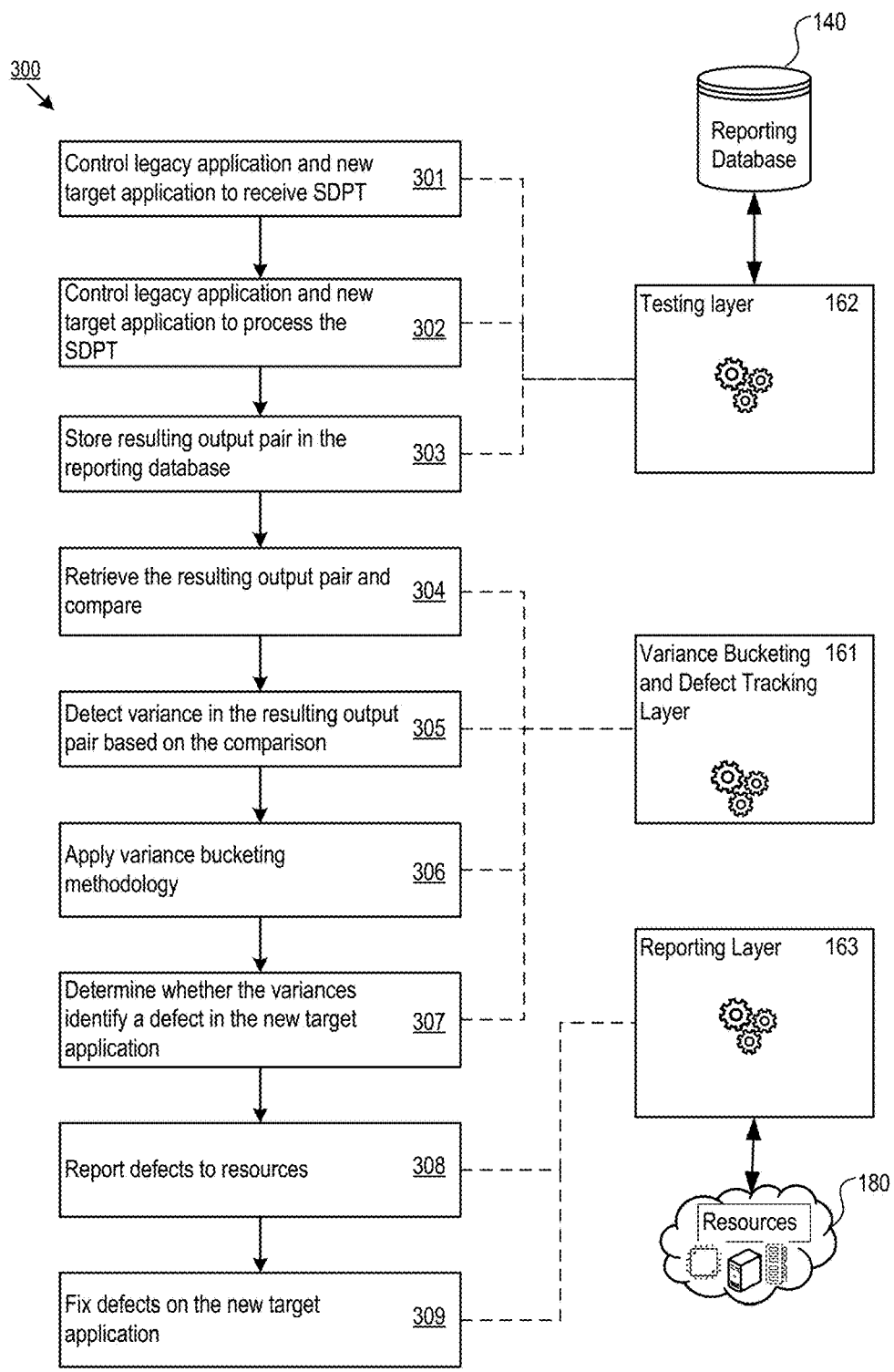
FIG. 3 shows an exemplary flow diagram of logic implemented by the parallel testing and reporting tool.

FIG. 3 shows an exemplary flow diagram 300 of logic describing a parallel testing and reporting process implemented by the PTR tool 160. When updating from the legacy application 120 to the new target system 130, parallel testing is implemented by comparing the outputs generated by the legacy application 120 to the outputs generated by the new target application 130 resulting from the processing of the same insurance claim inputs in the SDPT 110. By processing the insurance claims, both the legacy application 120 and the new target application 130 should output the same result, such as a determination on the insurance coverage applied to a participant (e.g., hospital, medical office, patient) identified in the insurance claim, or at least be within a range of acceptable variance (e.g., an acceptability threshold). Differences in the resulting outputs are an indication that the new target application 130 may be processing the same insurance claims in a manner that differs from that of legacy application 120. This can be problematic if the resulting insurance coverage determination output by the new target application 130 incorrectly applies the insurance coverage. Therefore, differences in the resulting outputs are further analyzed by the PTR tool 160 to determine whether an actual defect exists in the new target system 130 that requires fixing and/or further testing.

Initially, the testing layer 162 of the PTR tool 160 controls the legacy application 120 and the new target application 130 to receive the SDPT 110 (step 301). The SDPT 110 includes one or more insurance claims selected according to a selection strategy that references one or more sampling files.

The testing layer 162 controls the legacy application 120 and the new target application 130 to process the SDPT 110 (step 302). This includes processing insurance claims included in the SDPT 110. According to some embodiments, the SDPT 110 may be processed in "chunks" that include a predetermined number of insurance claims.

The testing layer 162 controls the storage of the resulting outputs from the legacy application 120 and the new target application 130 to be stored on the reporting database 140 (step 303). As described, the outputs resulting from the processing of the same insurance claims may be stored in pairs in the reporting database 140.

Initiating a comparison of the resulting outputs from the legacy application 120 and the new target application 130, the variance bucketing and defect tracking layer 161 controls a retrieval of a resulting output pair from the reporting database 140 (step 304). After receiving the resulting output pair from the reporting database 140, the variance bucketing and defect tracking layer 161 compares the resulting outputs in the resulting output pair to determine whether any differences are detected (step 305). During the comparison, the resulting output from the legacy application 120 is assumed to be the "correct" baseline output. Therefore, resulting outputs from the new target application 130 that deviate from the corresponding baseline output from the legacy application 120 are flagged by the variance bucketing and defect tracking layer 161 as potentially relating to a defect issue with the new target application 130. As described earlier, in some embodiments the resulting output from the new target application 130 is compared directly with the legacy claim processing results.

When the variance bucketing and defect tracking layer 161 flags a difference during the comparison, the variance bucketing and defect tracking layer 161 applies a variance bucketing methodology to categorize each of the detected variances (306). For example, certain variances may be within predetermined variance limits, and therefore not labeled as an actual defect needing further attention. Other variances may be beyond the predetermined variance limits, and therefore labeled as a detect requiring further attention. According to some embodiments, the variance may be identified automatically by the variance bucketing and defect tracking layer 161. According to some embodiments, the variance may be identified or confirmed, at least in part, by a user reviewing the comparison results.

Based on the application of the variance bucketing methodology, the variance bucketing and defect tracking layer 161 accordingly labels certain variances as defects requiring additional attention (step 307). If a valid reason for not reporting the variation between the resulting outputs cannot be identified, the reporting layer 163 reports the variation to the resource 180 (step 308). The resource 180 may be identified by the reporting layer 163, and a reporting message may be automatically transmitted to the resource 180. Upon receipt of the reporting message, the resource 180 is responsible for addressing any fixes to the new target application 130 and initiating another round of parallel testing to ensure the new target application 130 operates as intended (step 309).

Figure 4:
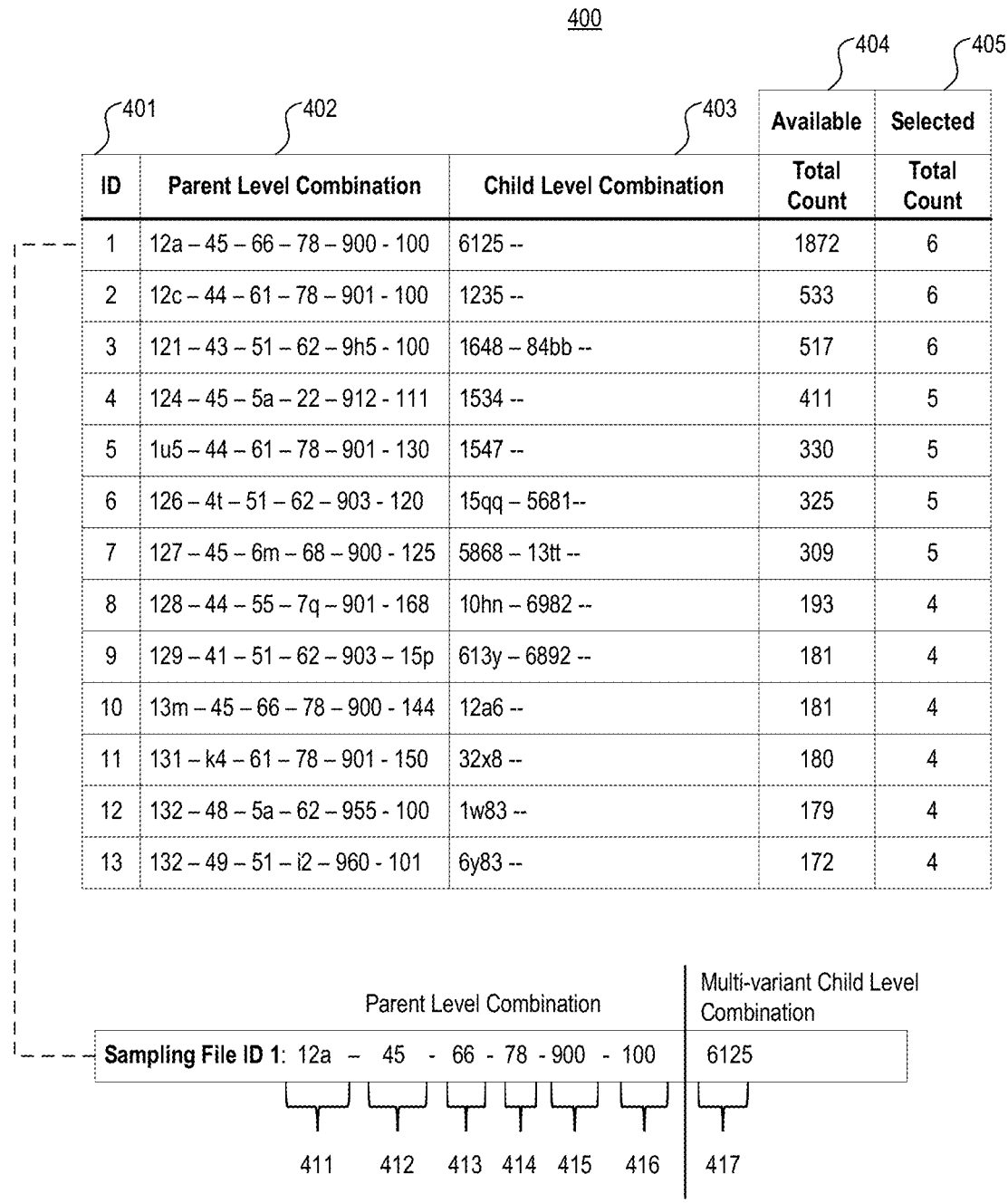
FIG. 4 shows an exemplary sampling file referenced by a test data selection methodology.

FIG. 4 shows a table 400 including thirteen exemplary combinational strings that comprise a sample imprint for selecting insurance claim type test data, where each combinational string is identified by a respective combinational string ID shown in column 401. Each combinational string is generated to be in a data format that includes a parent portion (e.g., header portion) comprised of a parent level combination as identified in column 402, and a multi-variant child portion (e.g., line level portion) comprised of a multi-variant child level combination as identified in column 403. The parent portion and the multi-variant child portion that comprise a row in the table 400 are representative of the combinational string.

Both the parent portion and the multi-variant child portion have their own unique fields. Each field includes a code corresponding to a specific claim attribute found on an insurance claim. Insurance claims sharing the claim attributes that are described by the codes in the fields of a sample imprint are identified as belonging to test data associated with the sample imprint. According to some embodiments, the sample imprint may be comprised of one or more portions comprised of one or more fields, where each field is representative of a code or other identifier representative of the data file being processed as the sample imprint.

One or more insurance claims that satisfy the combination of claim attributes included in the sample imprint may be selected for inclusion into the sample dataset from historical production. For example, column 404 shows a total number of eligible insurance claims that satisfy the combination of claim attributes from a respective sampling file, while column 405 shows a total number of insurance claims from the number of eligible insurance claims that have been selected into the sample dataset. In this way, the sample dataset is comprised of a number of insurance claims, or other type of test data, that represent a subset of insurance claims selected from a larger set of eligible insurance claims based on a selection strategy referencing the sample imprint described herein.

Described in more detail, the parent level combinations identified in column 402 include combinations of six fields, while the multi-variant child level combinations identified in column 403 include combinations of one or more fields. Each field identifies a code that corresponds to a claim attribute found on an insurance claim. A first combinational string 410 (combinational string ID 1) is separately reproduced in FIG. 4, and is shown to include the following field values in the parent level combination from column 402: insurance claim code "12a" in a first parent field 411; insurance claim code "45" in a second parent field 412; insurance claim code "66" in a third parent field 413; insurance claim code "78" in a fourth parent field 414; insurance code "900" in a fifth parent field 415; and insurance claim code "100" in a sixth parent field 416. The first combinational string 410 also includes the following field values in the multi-variant child level combination from column 403: insurance claim code "6125" in a first multi-variant child field 417. The parent fields may include insurance claim attributes related to, for example, the following information: a provider, a vendor configuration dimension, a line of business (LOB), a place of service (POS), and/or a general ledger (GL) accounting string element. The multi-variant child level field may include insurance claim attributes related to a service level item of a claim such as a benefit group identified in the insurance claims.

According to a claim selection strategy represented by the table 400, an exemplary sample dataset generated by referencing the first combinational string 410 (combinational string ID 1) identifies one thousand eight hundred seventy two (1872) eligible insurance claims including claim attributes that match the claim attributes identified by the fields of the first sampling file, and then selects six (6) insurance claims from the one thousand eight hundred seventy two (1872) eligible insurance claims. Still referring to the claim selection strategy represented by the table 400, an exemplary sample dataset generated by referencing the thirteenth combinational string (combinational string ID 13) identifies one hundred and seventy-two (172) available insurance claims that include claim attributes matching the claim attributes identified by the fields of the thirteenth combinational string, and then selects four (4) insurance claims from the one hundred and seventy-two (172) eligible insurance claims.

Generally, a claim selection strategy will select fewer insurance claims from a pool of eligible insurance claims as the pool of available insurance claims decreases. This trend is represented by the claim selection strategy illustrated by table 400. The claim selection strategy may also include a set of business rules determined by, for example, a client, historical results, or other desired criteria. There are also additional prioritization mechanisms for how to prioritize the selection of the six (6) insurance claims from the one thousand eight hundred seventy two (1872) eligible insurance claims, such as considering an ease of test setup (e.g., paper claims vs. electronic claims, where electronic claims are preferred).

The combinational strings that comprise the sample imprint described in FIG. 4 have been generated for selecting insurance claim types of test data into a sample dataset. According to other embodiments not related to insurance claim types of test data, the combinational strings that comprise the sample imprint may be comprised of one or more fields corresponding to identifiable characteristics and/or attributes of the test data being considered for inclusion into the sample dataset. A number of fields that comprise a combinational string, or a number of distinct portions that comprise a combinational string, may be dependent on the type of test data being considered for inclusion into the sample dataset. For example, a combinational string may be generated to be composed of a single portion, without a separate parent portion and multi-variant child portion, when the test data being considered for inclusion into the sample dataset is not an insurance claim type.

Figure 5:
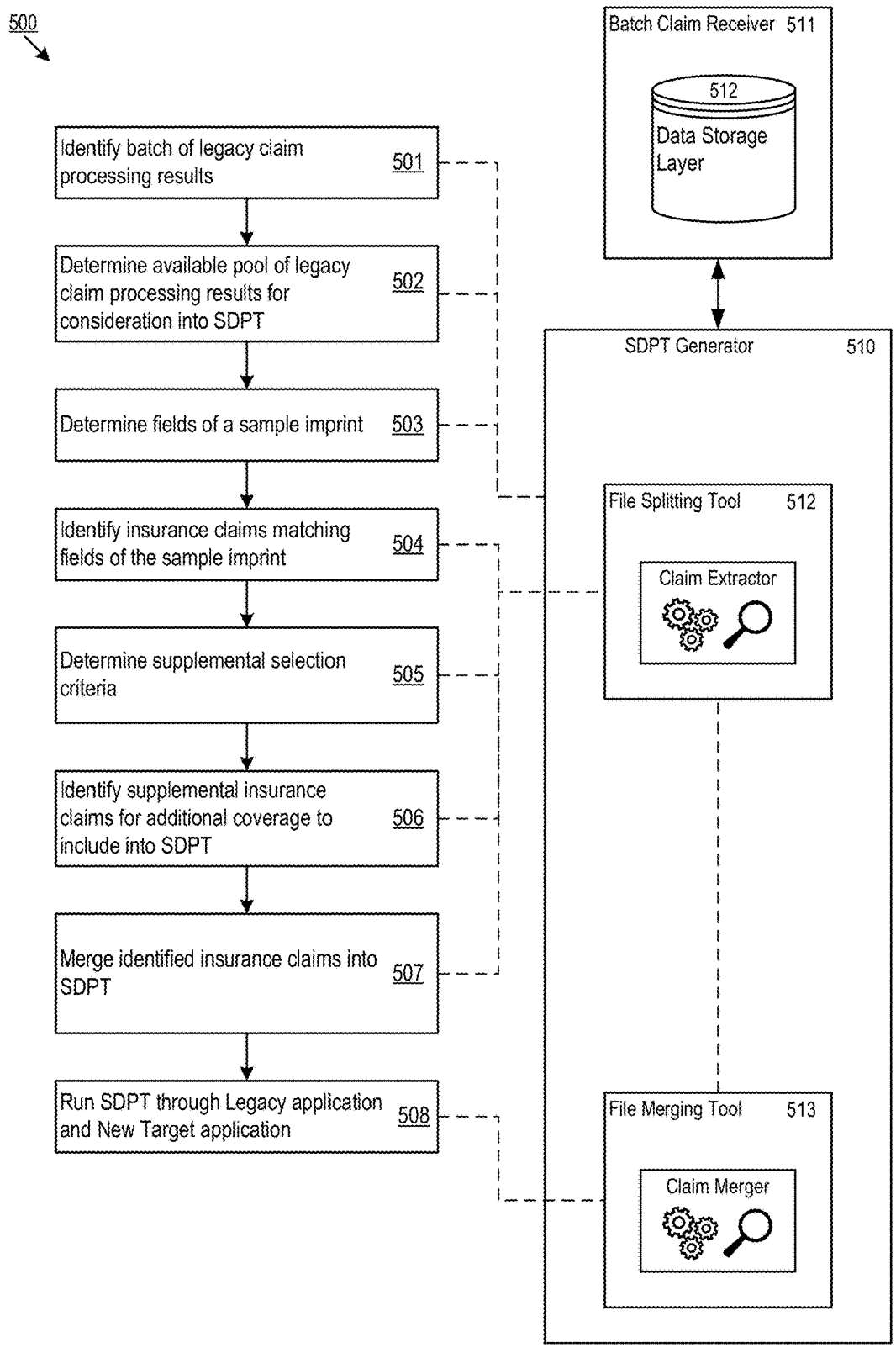
FIG. 5 shows an exemplary flow diagram of logic implemented by a sample dataset generator leveraging legacy healthcare claim files.

FIG. 5 shows an exemplary flow diagram 500 of logic describing a process for generating the SDPT 110 implemented, at least in part, by a SDPT generator 510. The SDPT generator 510 may be included as part of the PTR tool 160, or as a standalone device in communication with the PTR tool 160.

Initially, the SDPT generator 510 identifies a batch of legacy claim processing results previously processed by the legacy application 120, where the batch of legacy claim processing results is stored on a legacy database 512 of a batch claim receiver 511 (step 501). The batch claim receiver 511 includes the software, hardware, and circuitry for receiving the legacy claim processing results, either as a batch file or individually. Although shown separately, according to some embodiments the batch claim receiver may be included as part of the SDPT generator 510.

As the number of overall legacy claim processing results will likely be very large, and may include redundancies, the SDPT generator 510 initiates a pre-processing step to determine an initial available pool of legacy claim processing results for consideration into the SDPT 110 (502). The pre-processing step may include exclude certain insurance claims based on specific exclusion criteria. For example, exclusion criteria may consider an insurance claim type (e.g., insurance claim from an institutional, insurance claim from a professional provider, or the like), an insurance claim format (e.g., paper insurance claim, electronic insurance claim (EDI), or the like), or a specific exclusion rule. For example, an exclusion rule may include a time component such as focusing on excluding the last three months of production claims data.

FIG. 6 shows table 600 that represents a selection strategy for determining an available pool of insurance claims after excluding certain insurance claims based on an exclusion criteria. Table 600 identifies 35,527 institutional type insurance claims (of which 32,967 are electronic (EDI) insurance claims, and 2,560 are paper insurance claims), and 118,228 professional type insurance claims (of which 107,981 are electronic (EDI) insurance claims, and 10,247 are paper insurance claims). Here, the SDPT generator 510 initially receives 153,755 historical insurance claims, which will be reduced according to one or more exclusion criteria.

The selection strategy represented by the Table 600 include two separate exclusion criteria: 1) Date of Service (DOS) exclusion criteria; and 2) Exclusion criteria 1. The DOS exclusion criteria excludes insurance claims having a date of service less than six months, a year, or other predetermined length of time to avoid electronic (EDI) insurance claim identification issues. Exclusion criteria 1 may, for example, exclude all insurance claims which were processed by a third party. After excluding 11,748 insurance claims that satisfy the two exclusion criteria, Table 610 shows an available pool of insurance claims for inclusion into the SDPT 110 numbering 140,670 total insurance claims.

Referring back to FIG. 5, the SDPT generator 510 determines a number of fields to populate combinatorial strings that comprise a sample imprint, as well as a value to assign to the fields (step 503). Then, a file splitting tool 512 identifies insurance claims from the available pool of insurance claims that match the field values from the combinatorial strings in the sample imprint (step 504). For example, Table 610 shown in FIG. 6 represents a total of 117,917 insurance claims from the available pool of insurance claims satisfy the selection strategy criteria outlined by the sampling file dimension fields.

The file spitting tool 512 further determines a supplemental selection criteria for selecting a number of supplemental insurance claims for inclusion into the SDPT 110 based on, for example, input from a subject matter expert (step 505). The supplemental insurance claims may be selected to broaden coverage of the SDPT 110 to include specific types of claims (e.g., relating to an organ transplant or cancer) having certain claim attributes not adequately represented by selecting insurance claims from the pool of insurance claims satisfying the respective fields of the combinational strings that comprise the sample imprint. For example, Table 610 shows denied insurance claims are a first type of supplemental insurance claim. Table 700, in FIG. 7, further shows that of the 117,917 insurance claims that satisfy the selection strategy criteria of the referenced sample imprint, only 5,630 total insurance claims are selected from this pool. Not all insurance claims that match the fields of the combinational strings that comprise the sample imprint will be included in the SDPT 110. For example, for each of the combinational strings that are referenced by the selection strategy, the SDPT generator 510 may select a predetermined number or percentage of insurance claims that satisfy the respective fields in the combinational strings. The SDPT generator 510 may also consider a frequency (i.e., number of claims per unit of time) of insurance claims and/or insurance claims that are flagged as being prioritized, when selecting a number or percentage of insurance claims that satisfy the respective fields. Prioritization of insurance claims according to the selection strategy may deprioritize certain categories of insurance claims that are known to involve manual input of information, which increases the likelihood of mistakes in the insurance claim. For example, manually priced insurance claims, adjusted insurance claims, insurance claims having a zero net payable and/or zero cost share, or manually created insurance claims may be deprioritized.

To identify the supplemental claims, the file splitting tool 512 parses the initial batch of historical insurance claims, identifies insurance claims matching criteria for the supplemental claims, and tags insurance claims matching the supplemental claim criteria with an indicator (step 506). Insurance claims identified at (step 504) as matching fields of the combinatorial strings that comprise the sample imprint may be similarly tagged by the file splitting tool 512.

The file merging tool 513 identifies insurance claims that have been flagged at (step 504) and/or (step 506), and controls a file merging tool 513 to merge those insurance claims into the SDPT 110 (step 507). Table 700 shows that of the 22,752 denied insurance claims, a total of 116 denied insurance claims are selected for inclusion into the SDPT 110.

Afterwards, the SDPT 110 is transmitted to both the legacy application 120 and the new target application 130 for processing such that the SDPT 110 is run through both the legacy application 120 and the new target application 130 (step 508). Table 700 indicates that a total of 5,746 insurance claims are included into the SDPT 110.

FIG. 8 shows a Table 800, where Table 800 represents additional exemplary insurance claim selection strategies that references dimension fields in sampling files. The first row of Table 800 represents a first claim selection strategy that reads as follows: 1) three distinct sampling files have greater than or more than five hundred number of instances; 2) From the three distinct sampling files, a total of 2,919 insurance claims include the attributes that match the dimension fields in the respective three distinct sampling files; 3) The claim selection strategy determines five insurance claims satisfying each of the three distinct sampling files are selected, for a total of fifteen total insurance claims are selected. The selected number of combinations defined by a methodology rule of column 4 ("# Selected per Combination) may be modified to meet varying sampling weight requirements that will produce a different number of sampling files being selected.

The fifth row of Table 800 represents a fifth claim selection strategy that reads as follows: 1) 2,240 distinct sampling files have greater than or more than two number of instances; 2) From the 2,240 distinct sampling files, a total of 14,734 insurance claims include the attributes that match the dimension fields in the respective 2,240 distinct sampling files; 3) The claim selection strategy determines a single insurance claim satisfying each of the 2,240 distinct sampling files are selected, for a total of 2,240 total insurance claims are selected.

If all five claim insurance selection strategies are used, a total of 2,334 insurance claims may be selected for inclusion into the SDPT 110 when no other factors are considered. Table 800 demonstrates how multiple sampling files may be referenced to develop an overall selection strategy for including insurance claims into the SDPT 110. Table 800 also demonstrates how increasing the number of dimension fields of a sampling file results in fewer insurance claims matching the combination of dimension fields. Conversely, reducing the number of dimension fields in a sampling file results in increasing the number of insurance claims matching the combination of dimension fields. Therefore, the PTR tool 160 is able to control a number of insurance claims that are included in the SDPT 110 by modifying the number, or type, of dimension fields in a sampling file.

FIGS. 9-18 show exemplary GUIs displayed by the PTR tool 160 during implementation of various features. FIG. 9 displays a claims review GUI 900 for reviewing insurance claims that have been parallel processed through the legacy application 120 and the new target application 130. The claims review GUI 900 shown in FIG. 9 displays all insurance claims that have been reviewed during the parallel processing; however various filter options 910 are available to modify the insurance claims that are displayed.

In detail, the claims review GUI 900 identifies information related to claim attributes of an insurance claim, as well as status information on an insurance claim being parallel tested by the PTR tool 160. For example, the claims review GUI 900 includes a parallel test run identification (Run ID), insurance claim identification number (Claim ID), a tested by legacy or new target application indication (Sys: for legacy application; 'T' for new target application), a claim type (Claim Type), claim testing status (Claim Status), an overall testing status (Status), a claim state (State), a PCN match identifier (PCN Match), a PCN identifier (PCN), an insurance claims review status (Review Status), an MRN identifier (MCN), a date of service start date (DOS From), a data of service end date (DOS To), an insurance claim billing amount (Bill_Amt), an insurance claim billing amount variance between when the insurance claim is processed through the new target application 130 and the baseline from the legacy application 120 (Bill_Amt_Va), a cost shared amount between insurer and insured on an insurance claim (Cst_Shr), a variance in the cost shared amount between insurer and insured on an insurance claim when the insurance claim is processed through the new target application 130 and the baseline from the legacy application 120 (Cst_Shr_Var), a value of an allowed payout amount on an insurance claim (All_Amt), a value of variances in the allowed payout amount on an insurance claim when the insurance claim is processed through the new target application 130 and the baseline from the legacy application 120 (All_Amt_Var), among other information. Certain insurance claims shown on the claims review GUI 900 are marked with a pending identifier 901, indicating the insurance claim may require further analysis. For example, further analysis may be required to resolve a discrepancy flagged by a variance in resulting outputs from the parallel testing.

By selecting the pending identifier 901, a claims analysis GUI 1000 is displayed as shown in FIG. 10. By navigating the claims analysis GUI 1000, a testing resource has the option to input either a "clear pend" analysis that will clear the pending status of the insurance claim and subsequently identify the insurance claim as being clean, i.e., without defects. The claims analysis GUI 1000 shown in FIG. 10 depicts a scenario where the testing resource has input the "clear pend" analysis, as well as input information identifying the testing resource, describing comment on the "clear pend" analysis, and identifying an analysis completion date.

FIG. 11 shows another exemplary claims analysis GUI 1100 in a scenario where a "defect" analysis has been selected by a testing resource to indicate a defect in the parallel testing process. The defect is identified based on a financial variance detected during the parallel testing of the insurance claim through the legacy application 120 and the new target application 130. The financial variance may occur when an insurance claim does not produce the same billed amount, allowed amount, or cost shared amount when processed through the legacy application 120 and the new target application 130. The financial variance may be caused by a defect in the new target application 130 when it is not calculating the values correctly with respect to values calculated by the legacy application 120. Therefore, the new target application 130 may require further analysis and de-bugging when a financial variance is detected for an insurance claim during the parallel testing. When the variance is a known financial variance, the testing resource selects the financial variance source from a list of known financial variance sources, and also defines the financial variance by a corresponding code value.

Insurance claims that are marked with the "clear pend" analysis are subsequently determined to be clean, and therefore removed from the pending analysis status. However, insurance claims that are marked with the "defect" analysis are kept within the pending analysis status so that the testing resource continues to run the insurance claim through the parallel testing after each subsequent attempt at fixing a defect in the new target application 130 until the variance is brought to within acceptable levels. Each defect that is detected by the PTR tool 160 is monitored and tracked in a separate workflow. FIG. 12 shows a defect tracking GUI 1200 that monitors each of the defects with a claim ID, a temporary defect ID, a corresponding variance source, a description on the defect details, attachment file information, a defect type description, an identification of a testing resource that identified the defect, a date the defect was created, a coverage information, and a service area of the insurance claim.

FIG. 13 shows a defect tracking update GUI 1300, that includes options for a testing resource to input an approval status for a confirmed defect (e.g., approved, denied, or returned). An approved defect is a previously known defect that can further be assigned a known defect code value by the testing resource, as shown by the defect tracking update GUI 1300. When the defect is denied or returned, as shown by the defect tracking update GUI 1400 shown in FIG. 14, the testing resource has the option to send the defect notice back to the testing resource that either created the defect identification, or the testing resource that is otherwise assigned to handle the defect. A denied defect may be a defect that has not been previous defined, and thus will be assigned to the testing resource that created the defect notice. A returned defect identification serves as a flag that allows the testing resource to return the defect notice to another testing resource to handle (i.e., correctly defines or identifies the defect and/or handles the variance source creating the defect).

FIG. 15 shows a financial variance review GUI 1500 that presents similar or the same columns of information as shown on the claims review GUI 900 shown in FIG. 9. As discussed, the financial variance is defined as when an insurance claim does not produce the same billed amount, allowed amount, or cost shared amount when processed through the legacy application 120 and the new target application 130. The financial variance review GUI 1500 includes a variance analysis option 1501 that opens the variance analysis GUI 1600 shown in FIG. 16. The variance analysis GUI 1600 includes two options for use when the financial variance is acceptable, and when the financial variance is not acceptable. A financial variance that is not acceptable is a confirmed defect that requires further analysis. Therefore, a financial variance source and definition are input into the variance analysis GUI 1600 when the financial variance is not acceptable.

When the financial variance is acceptable, this indicates that while a variance in the billed amount, allowed amount, or cost shared amount is identified, the variance is within an acceptable range or another reason for accepting the variance without needing further analysis is accepted (e.g., known environmental reasons, expected variances, related to timing issues, or other reasons that are acceptable and/or does not require further fixing of the new target application 130). FIG. 17 shows a variance analysis GUI 1700 that includes exemplary information input by the testing resource when the financial variance is determined to be acceptable. For example, the variance analysis GUI 1700 identifies a source of the acceptable financial variance, a reason code for the acceptable financial variance, and comments related to the acceptable financial variance.

Figure 18:
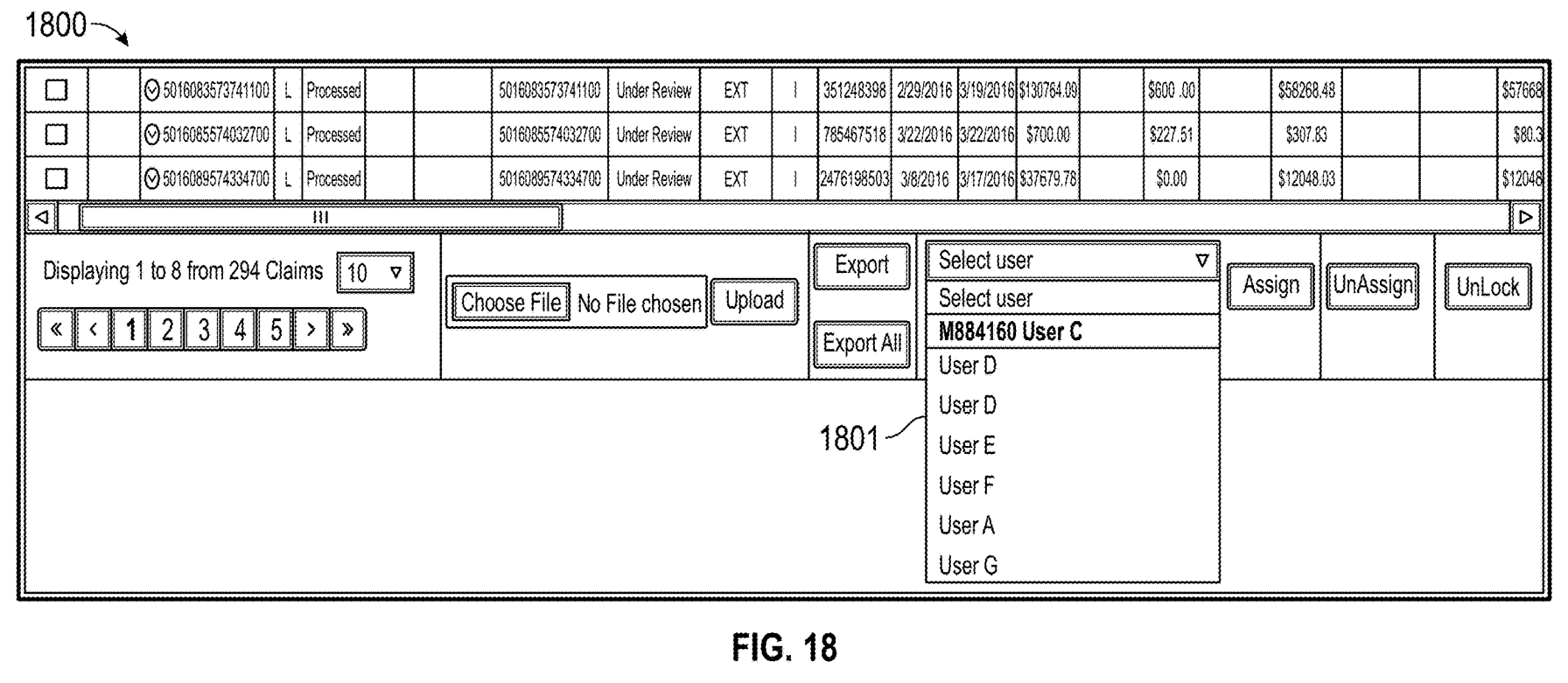

A unique testing resource may be assigned for each insurance claim that is included in the SDPT 110 and processed through the parallel testing by the PTR tool 160, as shown by the list of available testing resources 1801 included in the assignment GUI 1800 in FIG. 18. Once assigned to a testing resource, the assigned testing resource will be responsible for analyzing any defects that are identified for their assigned insurance claims and tracking the progress of remedial measures that are taken to fix the defects. In addressing the defects, the testing resources may oversee de-bugging or modification of the new target application 130 to get their output results to match the baseline output results from the legacy application 120, to be within an acceptable financial variance range, or determine whether another reason for determining the financial variance is acceptable might exist.

The methods, devices, processing, circuitry, and logic described above may be implemented in different ways and/or in different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and controlled, may be incorporated into a single memory or database, may be logically and physically organized in different ways, and may be implemented in many different ways. In other implementations, any of the databases may be part of a single database structure, and, more generally, may be implemented logically or physically in different ways. Each of the databases defines tables storing records that the control instructions 222 read, write, delete, and modify to perform the processing noted below. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry. Various implementations have been specifically described. However, many other implementations are also possible.

What is claimed is:

1. A computing device comprising:
   a machine-readable medium, other than a transitory signal; and
   instructions stored on the machine-readable medium, the instructions configured to, when executed, cause processing circuitry to:
   retrieve, from a reporting database:
   a first set of output results associated with a legacy application, and
   a second set of output results associated with a target application;

determine a variance result between the first set of
output results and the second set of output results;
determine the variance result is categorized into a
non-acceptable category bucket;
determine a defect is associated with the variance
result,
the defect determined based on the variance result
being categorized into the non-acceptable category bucket; and
assign a testing resource to the variance result.

2. The computing device of claim 1, wherein the instructions are further configured to, when executed, cause the processing circuitry to:
generate a testing status identifier, the testing status identifier identifying test data,
the test data parallel tested by the legacy application and the target application.

3. The computing device of claim 1, wherein the instructions are further configured to, when executed, cause the processing circuitry to:
generate a defect tracking GUI including at least one of: a variance source, a defect status identifier, a type of defect identifier, or a defect identifier.

4. The computing device of claim 1, wherein the instructions are further configured to, when executed, cause the processing circuitry to:
retrieve, from the reporting database:
a third set of output results associated with the legacy application, and
a fourth set of output results associated with the target application;
determine a supplemental variance result between the third set of output results and the fourth set of output results;
determine the supplemental variance result is an acceptable variance result and categorize the supplemental variance result into an acceptable category bucket; and
wherein the acceptable variance result includes at least one of: an environmental reason, an expected variance, a timing issue, or the variance result being within an acceptable range.

5. The computing device of claim 1, wherein the instructions are configured to, when executed, cause the processing circuitry to:
determine the variance result by determining test data processed by the legacy application and the target application does not output a same output results value.

6. The computing device of claim 5, wherein the instructions are further configured to, when executed, cause the processing circuitry to:
control subsequent parallel testing of the test data according to the testing resource when the variance result is categorized into the non-acceptable category bucket.

7. The computing device of claim 1, wherein the instructions are further configured to, when executed, cause the processing circuitry to:
transmit an assignment message to the testing resource.

8. A method comprising:
controlling, by a testing and reporting tool:
retrieval of a first set of output results,
the first set of output results associated with a legacy application, and
a second set of output results,
the second set of output results associated with a target application;
determining, by the testing and reporting tool, a variance result between the first set of output results and the second set of output results;
determining, by the testing and reporting tool, the variance result is categorized into a non-acceptable category bucket;
determining, by the testing and reporting tool, a defect is associated with the variance result,
the defect determined based on the variance result being categorized into the non-acceptable category bucket; and
assigning, by the testing and reporting tool, a testing resource to the variance result.

9. The method of claim 8, further comprising:
generating, by the testing and reporting tool, a testing status identifier, the testing status identifier including a testing status of test data,
the test data parallel tested by the legacy application and the target application.

10. The method of claim 8, further comprising:
generating, by the testing and reporting tool, a defect tracking GUI including at least one of: a variance source, a defect status, a type of defect, or a defect identifier.

11. The method of claim 8, further comprising:
controlling, by a testing and reporting tool, retrieval of a third set of output results associated with the legacy application and a fourth set of output results associated with the target application;
determining, by the testing and reporting tool, a supplemental variance result between the third set of output results and the fourth set of output results;
determining, by the testing and reporting tool, the supplemental variance result is an acceptable variance result and categorize the supplemental variance result into an acceptable category bucket; and
wherein the acceptable variance result includes at least one of: a known environmental reason, an expected variance, a known timing issues, the acceptable variance result being within an acceptable range, or a combination thereof.

12. The method of claim 8, wherein determining the variance result comprises determining test data processed by the legacy application and the target application does not output a same output results value.

13. The method of claim 12, further comprising:
controlling, by the testing and reporting tool, subsequent parallel testing of the test data according to the testing resource when the variance result is categorized into the non-acceptable category bucket.

14. The method of claim 8, further comprising:
transmitting, by the testing and reporting tool, an assignment message to the testing resource.

15. A computing device comprising:
a communication interface configured to:
retrieve, from a reporting database:
a first set of output results associated with a legacy application, and
a second set of output results associated with a target application; and
a processing circuitry configured to:
determine a variance result between the first set of output results and the second set of output results;
determine the variance result is categorized into a non-acceptable category bucket;

determine a defect is associated with the variance result based on the variance result being categorized into the non-acceptable category bucket; and assign a testing resource to the variance result.

16. The computing device of claim 15, wherein the processing circuitry is further configured to:

generate a test data analysis GUI including a testing status of test data parallel tested by the legacy application and the target application.

17. The computing device of claim 15, wherein the processing circuitry is further configured to:

generate a defect tracking GUI including at least one of: a variance source, a defect status, a type of defect, or a defect identifier.

18. The computing device of claim 15, wherein the processing circuitry is further configured to:

retrieve, from the reporting database, a third set of output results associated with the legacy application and a fourth set of output results associated with the target application;

determine a supplemental variance result between the third set of output results and the fourth set of output results;

determine the supplemental variance result is an acceptable variance result and categorize the supplemental variance result into an acceptable category bucket; and wherein the acceptable variance result includes at least one of: an environmental reason, an expected variance, a timing issue, or the variance result being within an acceptable range.

19. The computing device of claim 15, wherein the processing circuitry is further configured to:

determine the variance result by determining test data processed by the legacy application and the target application does not output a same output results value.

20. The computing device of claim 19, wherein the processing circuitry is further configured to:

control subsequent parallel testing of the test data according to the testing resource when the variance result is categorized into the non-acceptable category bucket.

* * * * *

UNITED STATES PATENT AND TRADEMARK OFFICE
CERTIFICATE OF CORRECTION

PATENT NO. : 10,795,807 B2
APPLICATION NO. : 16/273456
DATED : October 6, 2020
INVENTOR(S) : Ajay Mody et al.

Page 1 of 1

It is certified that error appears in the above-identified patent and that said Letters Patent is hereby corrected as shown below:

In the Specification

In Column 13, starting near the end of Line 50 and beginning of Line 51, delete the phrase "Sys: for legacy application;" and insert in its place --Sys: 'L' for legacy application;--.

Signed and Sealed this
Fifteenth Day of December, 2020

Andrei Iancu
*Director of the United States Patent and Trademark Office*